(12) United States Patent  
Griffin

(10) Patent No.: US 11,796,087 B2  
(45) Date of Patent: Oct. 24, 2023

(54) COUPLING BRACKET FOR FLUID DELIVERY SYSTEMS

(71) Applicant: John P. Griffin, Sykesville, MD (US)

(72) Inventor: John P. Griffin, Sykesville, MD (US)

( * ) Notice: Subject to any disclaimer, the term of this patent is extended or adjusted under 35 U.S.C. 154(b) by 560 days.

(21) Appl. No.: 16/141,011

(22) Filed: Sep. 25, 2018

(65) Prior Publication Data

US 2019/0390795 A1 Dec. 26, 2019

Related U.S. Application Data

(60) Provisional application No. 62/689,898, filed on Jun. 26, 2018.

(51) Int. Cl.
*F16L 3/00* (2006.01)
*A01G 25/02* (2006.01)

(52) U.S. Cl.
CPC ............... *F16L 3/00* (2013.01); *A01G 25/02* (2013.01)

(58) Field of Classification Search
CPC ........................................................ F16L 3/00
USPC ..................................... 285/61, 64, 87, 312
See application file for complete search history.

(56) References Cited

U.S. PATENT DOCUMENTS

| | | | | |
|---|---|---|---|---|
| 106,527 A | * | 8/1870 | Woodruff | F16L 3/04 248/71 |
| 185,075 A | * | 12/1876 | Clapp et al. | F16L 5/00 285/64 |
| 723,347 A | * | 3/1903 | Wessinger | F16L 3/00 285/61 |
| 780,420 A | * | 1/1905 | Gross | F16L 3/00 248/70 |
| D47,985 S | * | 10/1915 | Bissell | D13/152 |
| 1,368,013 A | * | 2/1921 | Babcock | F16L 3/00 285/55 |
| RE15,595 E | * | 5/1923 | Bennett | E03D 11/14 4/252.3 |
| 2,168,066 A | * | 8/1939 | Jackes et al. | F16L 3/00 126/318 |
| 2,769,647 A | * | 11/1956 | Harstick | F16L 3/02 285/31 |
| 2,799,533 A | * | 7/1957 | Bachli | F16L 35/00 239/282 |
| 2,860,008 A | * | 11/1958 | Jacoby | F16L 3/00 239/726 |
| 4,950,840 A | * | 8/1990 | Zetena | F16L 3/00 174/66 |

(Continued)

FOREIGN PATENT DOCUMENTS

| | | | | |
|---|---|---|---|---|
| AT | 14055 U2 | * | 3/2015 | ............... F16L 3/00 |
| JP | 01220793 A | * | 9/1989 | ............... F16L 3/00 |
| JP | 08068477 A | * | 3/1996 | ............... F16L 3/00 |

*Primary Examiner* — Matthew Troutman
*Assistant Examiner* — Fannie C Kee
(74) *Attorney, Agent, or Firm* — Frost Brown Todd LLP

(57) ABSTRACT

A coupling bracket for use with fluid and/or gas delivery systems that includes an elongated central body portion having a first end portion, a second end portion, and a channel running lengthwise therethrough; a first connecting region formed on the first end portion, wherein the first connecting region is adapted to receive a first accessory device in a non-threaded manner; and a second connecting region formed on the second end portion, wherein the second connecting region is adapted to receive a second accessory device in a non-threaded manner.

17 Claims, 11 Drawing Sheets

(56) References Cited

U.S. PATENT DOCUMENTS

| | | | |
|---|---|---|---|
| 2002/0067039 A1* | 6/2002 | Street | F16L 55/11 285/45 |
| 2008/0042430 A1* | 2/2008 | Ichikawa | F16L 3/00 285/61 |
| 2018/0147593 A1 | 5/2018 | Griffin | |

* cited by examiner

COUPLING BRACKET FOR FLUID DELIVERY SYSTEMS

CROSS-REFERENCE TO RELATED APPLICATIONS

This patent application claims the benefit of U.S. Provisional Patent Application Ser. No. 62/689,898 filed on Jun. 26, 2018 and entitled "Connector Device for Irrigation System Components," the disclosure of which is hereby incorporated by reference herein in its entirety and made part of the present U.S. utility patent application for all purposes.

BACKGROUND OF THE INVENTION

The described invention relates in general to fluid delivery systems such as irrigation systems and the like, and more specifically to a coupling bracket for use with the components of complex irrigation systems and other fluid delivery systems that utilize multiple components that are connected to one another.

Fluid delivery systems such as commercial/industrial irrigation systems are commonly used in modern society. Depending on the specific use of these systems such as, for example, for crops such as corn and wheat, effective placement of sprinkler heads can be challenging because crops grow over time and the required height of the sprinkler heads changes. In other situations, easily locating system components such as hoses and the like in a manner that prevents or reduces hazards to the users of such systems is highly desirable. Accordingly, there is an ongoing need for a device or apparatus that may be used with the various components included in large and/or small-scale fluid delivery systems that permits the components in these systems to be spatially repositioned (e.g., raised, lowered, or positioned horizontally) as needed or desired.

SUMMARY OF THE INVENTION

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

In accordance with one aspect of the present invention, a first coupling bracket for use with fluid and/or gas delivery systems is provided. This coupling bracket includes an elongated central body portion having a first end portion, a second end portion, and a channel running lengthwise therethrough; a first connecting region formed on the first end portion, wherein the first connecting region is adapted to receive a first accessory device in a non-threaded manner; and a second connecting region formed on the second end portion, wherein the second connecting region is adapted to receive a second accessory device in a non-threaded manner.

In accordance with another aspect of the present invention, a second coupling bracket for use with fluid and/or gas delivery systems is provided. This coupling bracket includes an elongated central body portion having a first end portion, a second end portion, and a channel running lengthwise therethrough; a first connecting region formed on the first end portion, wherein the first connecting region is adapted to receive a first accessory device in a non-threaded manner; a second connecting region formed on the second end portion, wherein the second connecting region is adapted to receive a second accessory device in a non-threaded manner; and wherein the first connecting region is positioned at a predetermined angle relative to the second connecting region, and wherein the predetermined angle is between 10° and 170°.

In yet another aspect of this invention, a third coupling bracket for use with fluid or gas delivery systems is provided. This coupling bracket includes an elongated central body portion having a first end portion, a second end portion, and a channel running lengthwise therethrough; a first connecting region formed on the first end portion, wherein the first connecting region is adapted to receive a first accessory device in a non-threaded manner; a second connecting region formed on the second end portion, wherein the second connecting region is adapted to receive a second accessory device in a non-threaded manner; a substantially flat base; and a connector disposed between the base and the elongated central body portion.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
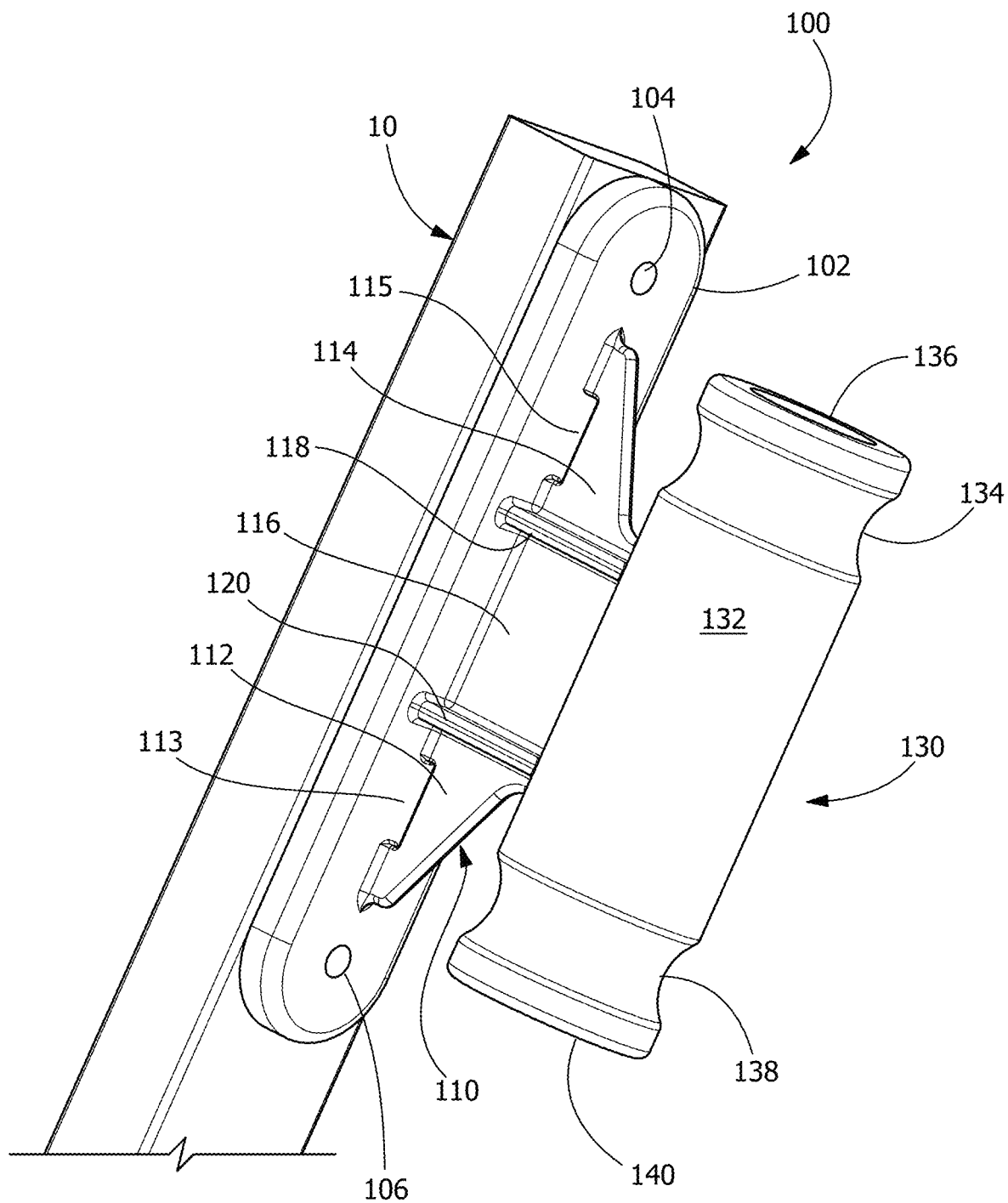
FIG. 1 is a perspective side view of a coupling bracket in accordance with a first exemplary embodiment of the present invention, wherein the coupling bracket is shown in a "male/male" configuration, and wherein the coupling bracket is mounted to a post.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated, the present invention relates in general to fluid delivery systems such as irrigation systems and the like, and more specifically to a "height creating" coupling bracket for use with the components of complex irrigation systems and other fluid delivery systems that utilize multiple components that are connected to one another. The coupling bracket of the present invention is particularly suited for use with the commercially available GrifTek PowerPost™ system, which is described in U.S. patent application Ser. No. 15/667,367, which is hereby incorporated by reference herein in its entirety and made part of the present U.S. utility patent application for all purposes. In certain embodiments of this invention, the coupling bracket is mounted on a horizontal surface for applications wherein changing height is not necessarily a factor. In these embodiments, the coupling bracket is adapted to permit rapid attaching and detaching of hoses and other system components and to provide a means by which hoses can be positioned such that they are not inconveniently located and do not present a tripping hazard.

Figure 2:
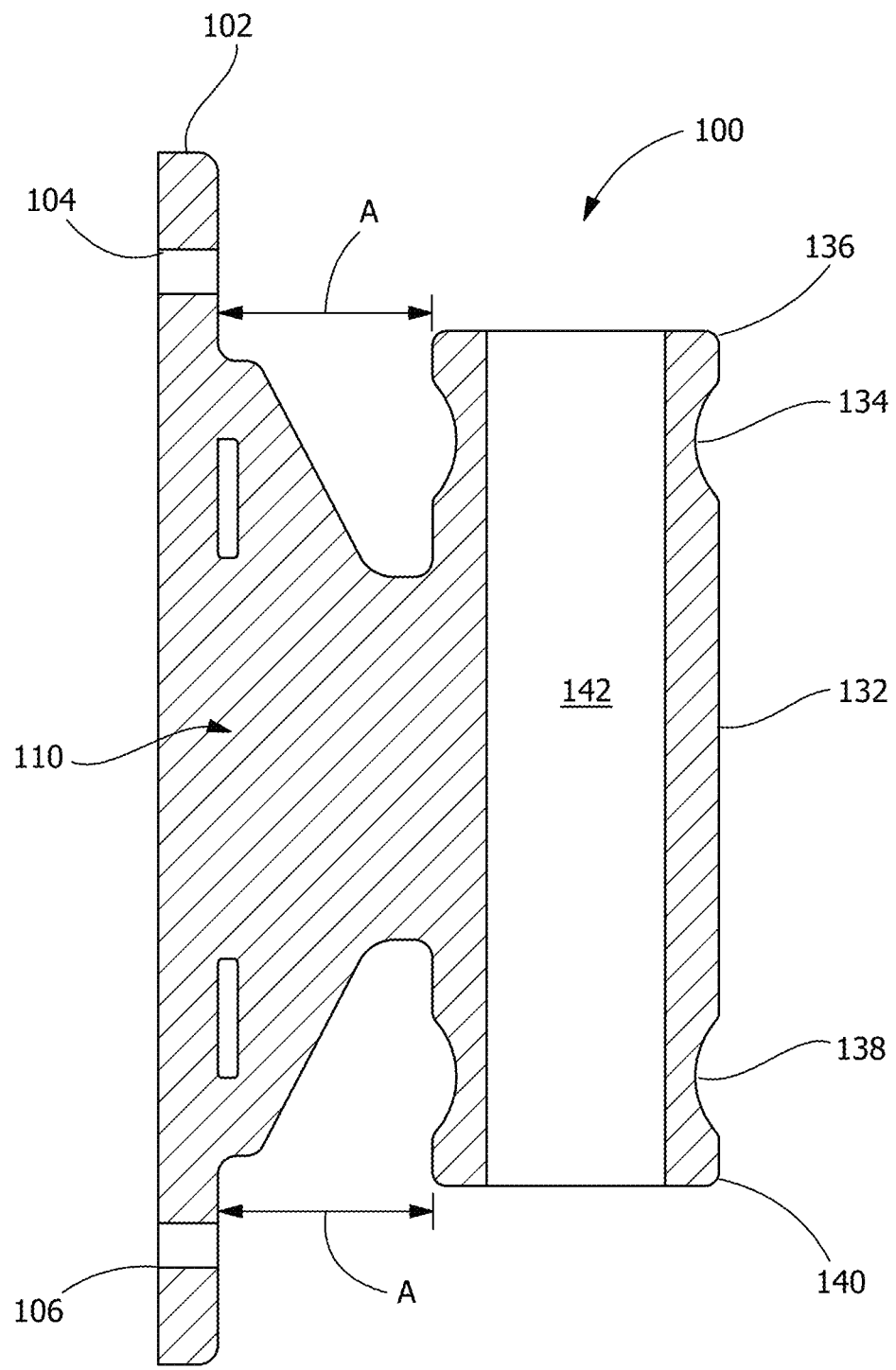
FIG. 2 is a cross-sectional side view of the coupling bracket of FIG. 1.
Figure 12:
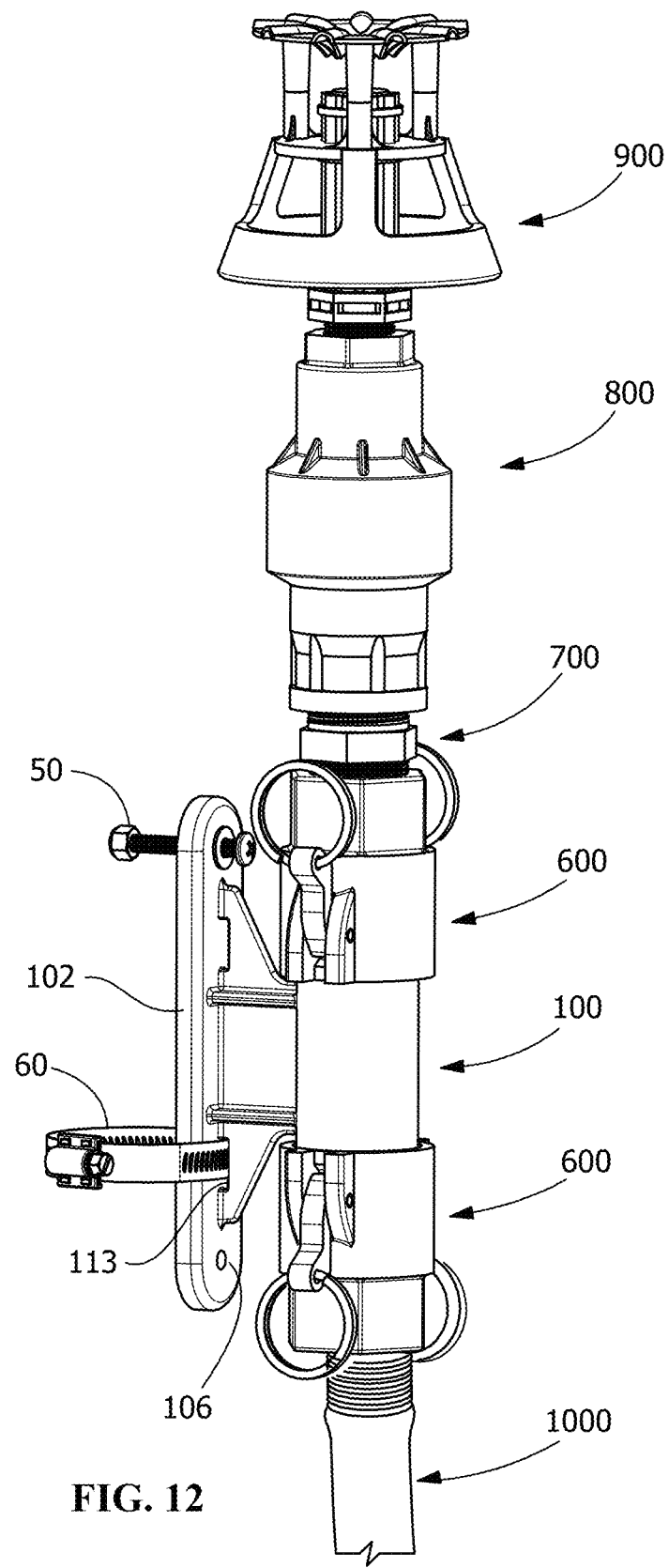
FIG. 12 is an assembled view of the irrigation system of FIG. 11 showing the various components thereof properly connected to one another to create a functional system.

FIG. 1 provides a perspective side view of a coupling bracket in accordance with a first exemplary embodiment of the present invention, wherein the coupling bracket is shown in a "male/male" configuration, and wherein the coupling bracket is mounted to a post. FIG. 2 provides a cross-sectional side view of the coupling bracket of FIG. 1. With regard to this embodiment and as shown in FIGS. 1-2, coupling bracket 100 includes base 102; connector 110; and coupling apparatus 130. Base 102 is generally flat and includes first mounting aperture 104; and second mounting aperture 106. Connector 110 is disposed between base 102 and coupling apparatus 130 and includes first side portion 112; opening 113 (which is adapted to receive strap 60 as shown in FIG. 12); second side portion 114; opening 115 (which is also adapted to receive strap 60); center portion 116; first reinforcement rib 118; and second reinforcement rib 120. In this embodiment and in other embodiments disclosed herein, connector 110 is a scalable component of the coupling bracket of the present invention. The length of connector 110 (see distance "A" in FIG. 2) may be increased or decreased based on the intended use of coupling bracket 100 and in some embodiments connector 110 is up to 15 inches or more in length. Coupling apparatus 130 includes cylindrical body 132, a first (i.e., upper) connecting region and a second (i.e., lower) connecting region. The first connecting region includes first contoured portion 134 and first flange 136 and the second connecting region includes second contoured portion 138 and second flange 140. Both the upper and lower connecting regions are adapted to mate with a cam lever connector 600 (see FIGS. 8-9). Passing completely through the length of coupling apparatus 130 is channel 142, which acts as a fluid conduit for water or similar substance. In this and other embodiments, channel 142 is used as a conduit for air or other gas.

Figure 3:
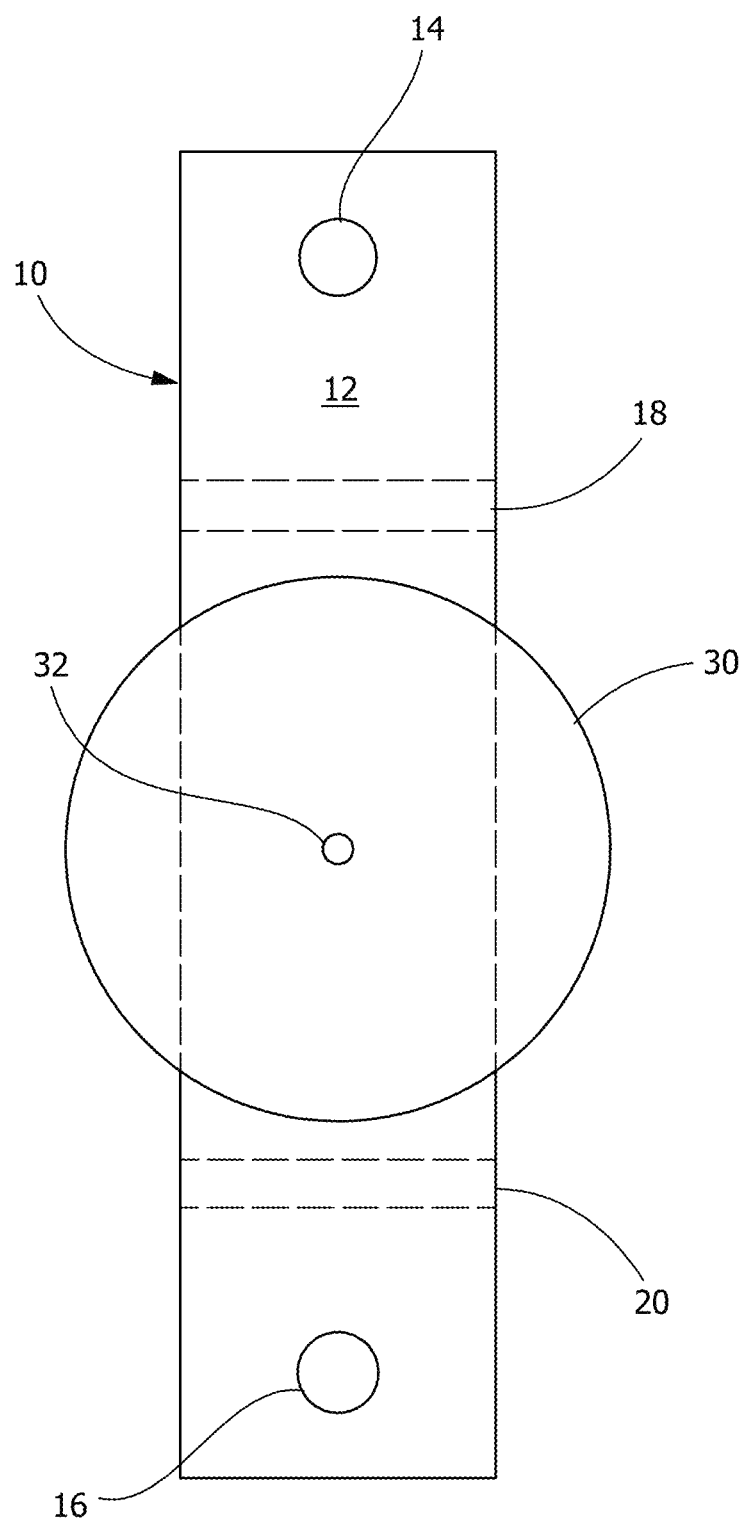
FIG. 3 is a front view of a post upon which the coupling brackets of the present invention may be mounted when in use, wherein a face plate has been attached to the post for allowing a coupling bracket that has been mounted thereon to rotate in a circular manner.

Again with reference to FIG. 1, coupling bracket 100 is mounted to a support post, which in various embodiments of this invention is telescoping in nature (or otherwise adjustable) such that the overall height of the support post can be increased or decreased as desired or as necessary, or wherein coupling bracket 100 can be moved upward or downward on the support post and secured thereto at various locations. As shown in FIG. 3, an exemplary embodiment of support post assembly 10 includes post 12; first mounting aperture 14 (corresponding to first mounting aperture 104 in base 102, wherein bolt/nut assembly 50 is used to attach base 102 to post 12 as shown in FIG. 12); second mounting aperture 16 (corresponding to second mounting aperture 106 in base 102, wherein bolt/nut assembly 50 is used to attach base 102 to post 12 as shown in FIG. 12); first mounting channel 18 (which corresponds to the placement of opening 113 in base 102, which is adapted to receive a metal strap as shown in FIG. 12); and second mounting channel 20 (which corresponds to the placement of opening 115 in base 102, which is adapted to receive metal strap 60 as shown in FIG. 12).

Figure 4:
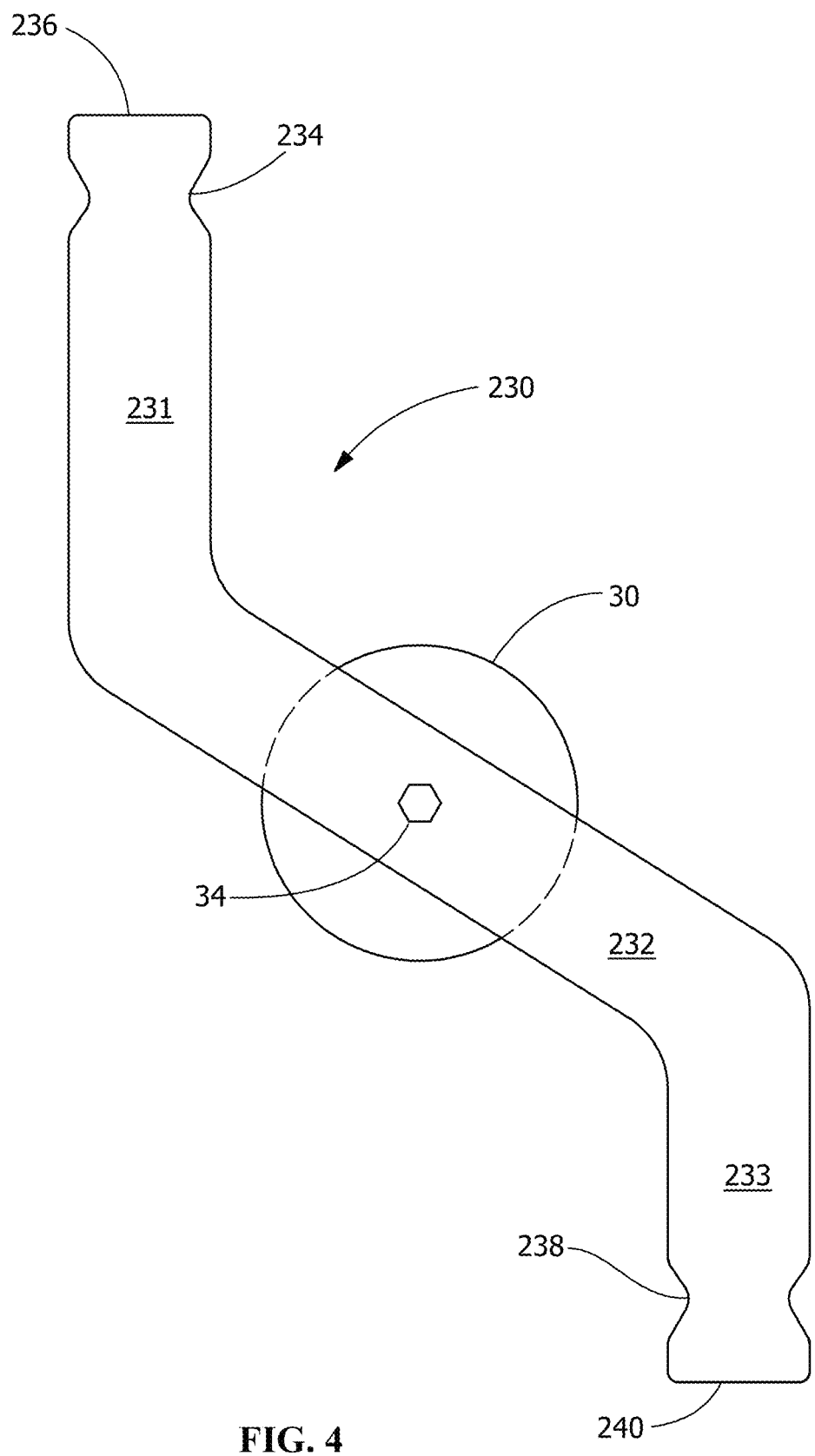
FIG. 4 is a front view of a coupling bracket in accordance with a second exemplary embodiment of the present invention, wherein the coupling bracket is shown in a "male/male" configuration, and wherein the coupling bracket has been mounted on a face plate such as that shown in FIG. 3.

Certain embodiments of this invention do not necessarily include a base portion, but rather the coupling apparatus component is mounted to a face plate that allows the coupling apparatus to be rotated 360°. As shown in FIG. 3, 360° face plate 30 is mounted on post 12 and includes mounting aperture 32 formed centrally therein. As shown in FIG. 4, coupling apparatus 230, which is also shown in a male/male configuration, includes first body portion 231; second (angled) body portion 232; and third body portion 233. Coupling apparatus 230 also includes a first (i.e., upper) connecting region and a second (i.e., lower) connecting region. The first connecting region includes first contoured portion 234 and first flange 236 and the second connecting region includes second contoured portion 238 and second flange 240. Both the upper and lower connecting regions are adapted to mate with cam lever connector 600 (see FIGS. 8-9). Passing completely through the length of coupling apparatus 230 is a channel that acts as a fluid conduit for water or other substance. As shown in FIG. 4, coupling apparatus 230 is mounted to 360° face plate 30 using bolt 34 in a manner that permits coupling apparatus 230 to be rotated into various positions as desired or as needed for proper functioning of the system. This embodiment is particularly suited for systems that utilize both downward facing sprinklers and upward facing sprinklers based on the growth patterns of the plants or crops being irrigated.

Figure 5:
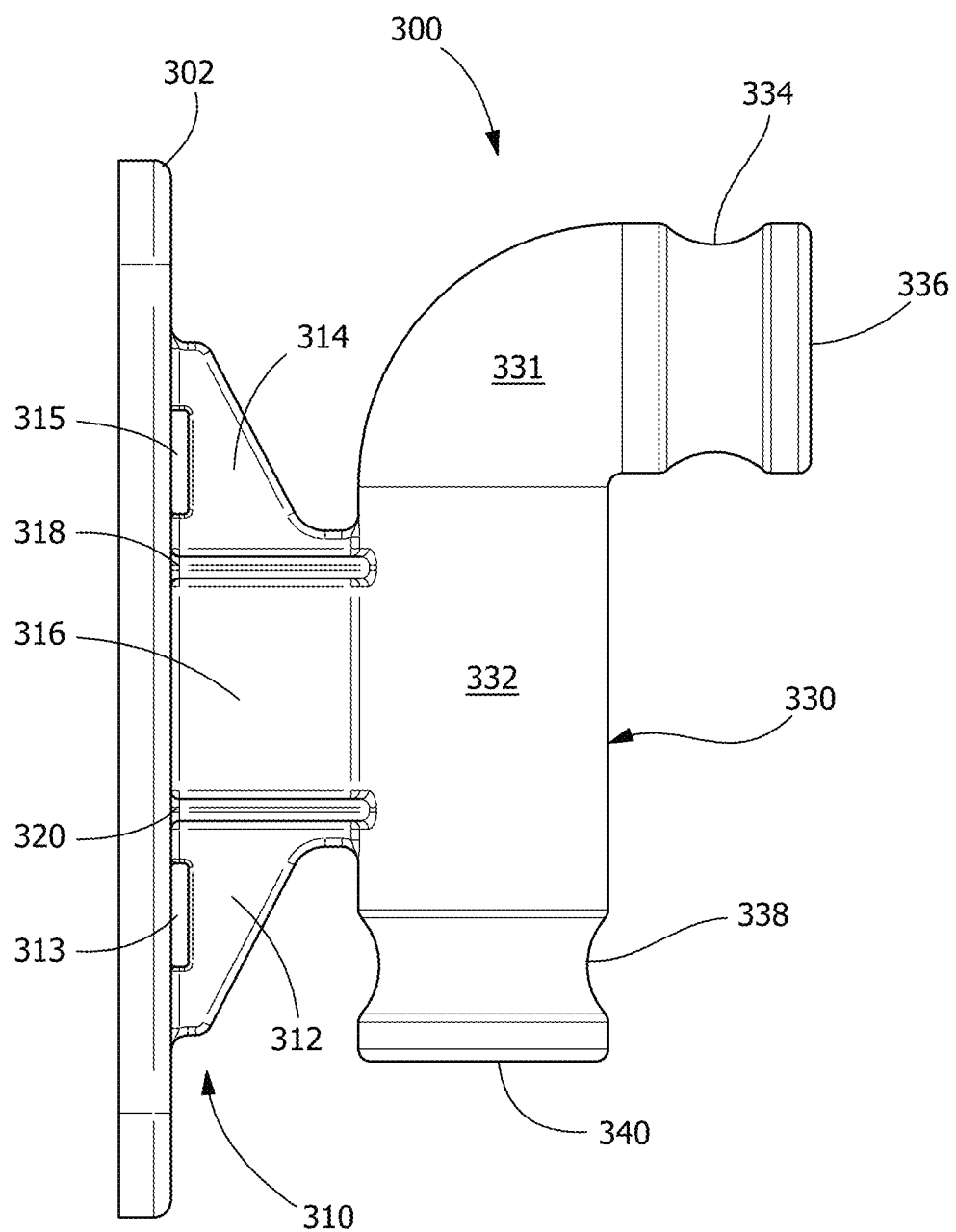
FIG. 5 is a side view of a coupling bracket in accordance with a third exemplary embodiment of the present invention, wherein the coupling bracket is shown in a "male/male" configuration, and wherein a 90° turn has been formed in the body of the coupling bracket.

FIG. 5 provides a side view of a coupling bracket in accordance with a third exemplary embodiment of the present invention, wherein the coupling bracket is shown in a "male/male" configuration, and wherein a 90° turn has been formed in the body of the coupling bracket. With regard to this embodiment, coupling bracket 300 includes base 302; connector 310; and coupling apparatus 330. Connector 310 is disposed between base 302 and coupling apparatus 330 and includes first side portion 312; opening 313 (which is adapted to receive strap 60 as shown in FIG. 12); second side portion 314; opening 315 (which is also adapted to receive strap 60); center portion 316; first reinforcement rib 318; and second reinforcement rib 320. In this embodiment, connector 310 is a scalable component of the coupling bracket of the present invention. The length of connector 310 may be increased or decreased based on the intended use of coupling bracket 310 and in some embodiments connector 310 is up to 15 inches or more in length. Coupling apparatus 330 includes angled body portion 331, which is positioned above cylindrical body 332, a first (i.e., upper) connecting region and a second (i.e., lower) connecting region. The first connecting region includes first contoured portion 334 and first flange 336 and the second connecting region includes second contoured portion 338 and second flange 340. Both the first/upper and second/lower connecting regions are adapted to mate with a cam lever connector 600 (see FIGS. 8-9). Passing completely through the length of coupling apparatus 330 is a channel, which acts as a fluid conduit for water or other substance. In FIG. 5, angled body portion 331 places the upper connecting region at a roughly 90° angle relative to the lower connecting region. In other embodiments, this angle is 45° or any other suitable angle larger or smaller than 90°.

Figure 6:
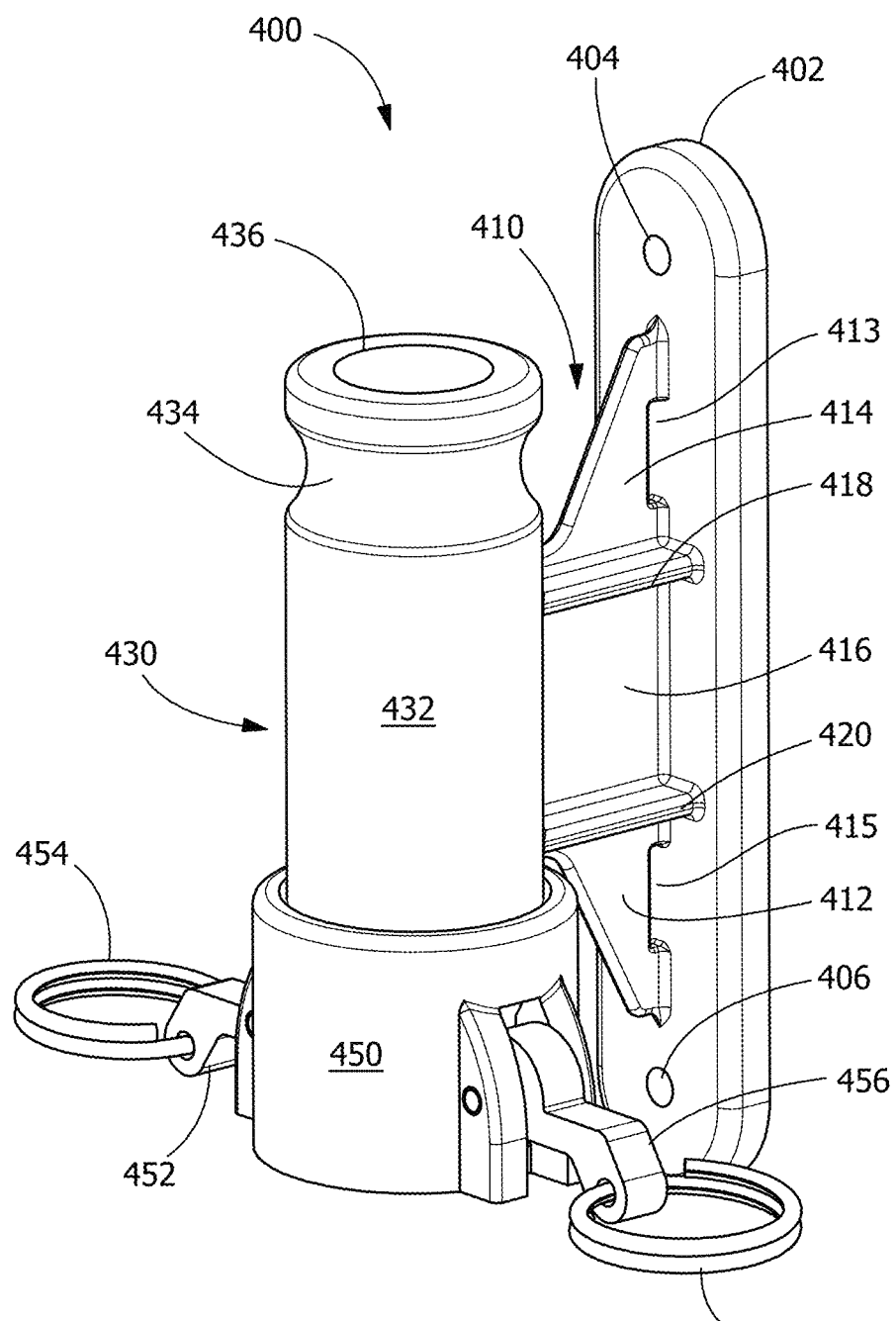
FIG. 6 is a perspective side view of a coupling bracket in accordance with a fourth exemplary embodiment of the present invention, wherein one of the male ends of the coupling bracket has been replaced with a cam lever coupler to create a "male/female" configuration.

FIG. 6 provides a perspective side view of a coupling bracket in accordance with a fourth exemplary embodiment of the present invention, wherein one of the male ends of the coupling bracket has been replaced with a cam lever coupler to create a "male/female" configuration. With regard this embodiment, coupling bracket 400 includes base 402; connector 410; and coupling apparatus 430. Base 402 is generally flat and includes first mounting aperture 404; and second mounting aperture 406. Connector 410 is disposed between base 402 and coupling apparatus 430 and includes first side portion 412; opening 413 (which is adapted to receive strap 60 as shown in FIG. 12); second side portion 414; opening 415 (which is also adapted to receive strap 60); center portion 416; first reinforcement rib 418; and second reinforcement rib 420. In this embodiment, connector 410 is a scalable component of the coupling bracket of the present invention. The length of connector 410 may be increased or decreased based on the intended use of coupling bracket 400 and in some embodiments connector 410 is up to 15 inches or more in length. Coupling apparatus 430 includes cylindrical body 432, a first (i.e., upper) connecting region and a second (i.e., lower) connecting region. The first/upper connecting region includes first contoured portion 434 and first flange 436 and is adapted to mate with a cam lever connector 600 (see FIGS. 8-9). The second/lower connecting region is formed integrally with and positioned beneath cylindrical body 432 and includes certain structural aspects that are similar to or the same as the cam lever connector shown in FIGS. 8-9. Accordingly, as shown in FIG. 6, cam lever connector 450 includes first lever 452, first pull ring 454, second lever 456, and second pull ring 458. Passing completely through the length of coupling apparatus 430 is a channel, which acts as a fluid conduit for water or other substance.

Figure 7:
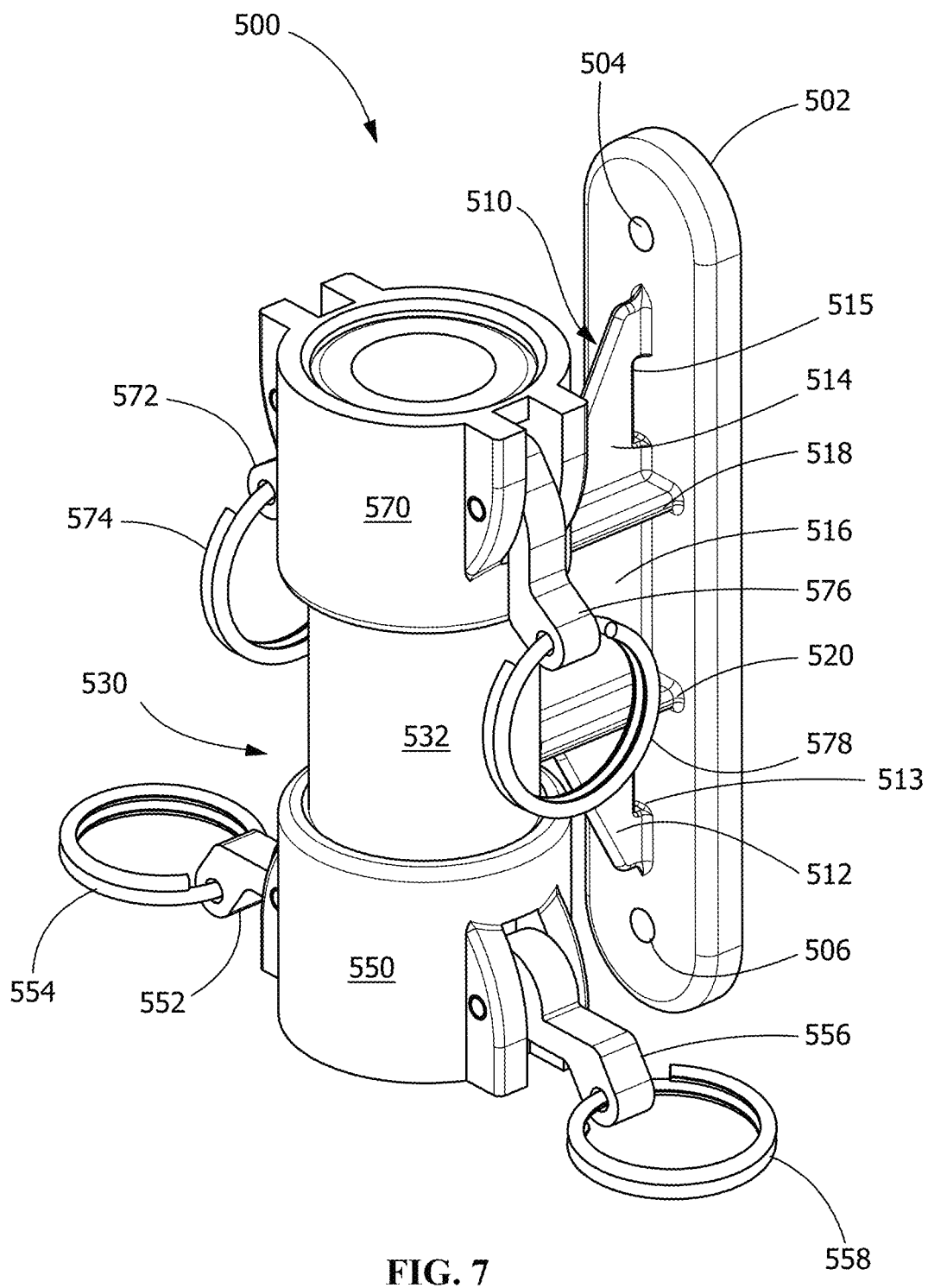
FIG. 7 is a perspective side view of a coupling bracket in accordance with a fifth exemplary embodiment of the present invention, wherein both of the male ends of the coupling bracket have been replaced with cam lever couplers to create a "female/female" configuration.

FIG. 7 provides a perspective side view of a coupling bracket in accordance with a fifth exemplary embodiment of the present invention, wherein both of the male ends of the coupling bracket have been replaced with cam lever couplers to create a "female/female" configuration. With regard this embodiment, coupling bracket 500 includes base 502; connector 510; and coupling apparatus 530. Base 502 is generally flat and includes first mounting aperture 504; and second mounting aperture 506. Connector 510 is disposed between base 502 and coupling apparatus 530 and includes first side portion 512; opening 513 (which is adapted to receive strap 60 as shown in FIG. 12); second side portion 514; opening 515 (which is also adapted to receive strap 60); center portion 516; first reinforcement rib 518; and second reinforcement rib 520. In this embodiment, connector 510 is a scalable component of the coupling bracket of the present invention. The length of connector 510 may be increased or decreased based on the intended use of coupling bracket 500 and in some embodiments connector 510 is up to 15 inches or more in length. Coupling apparatus 530 includes cylindrical body 532, a first (i.e., upper) connecting region and a second (i.e., lower) connecting region. The second/lower connecting region is formed integrally with and positioned beneath cylindrical body 532 and includes certain structural aspects that are similar to or the same as the cam lever connector shown in FIGS. 8-9. Accordingly, as shown in FIG. 7, first cam lever connector 550 includes first lever 552, first pull ring 554, second lever 556, and second pull ring 558. The first/upper connecting region is formed integrally with and positioned above cylindrical body 532 and includes certain structural aspects that are similar to or the same as the cam lever connector shown in FIGS. 8-9. Accordingly, as shown in FIG. 7, second cam lever connector 570 includes first lever 572, first pull ring 574, second lever 576, and second pull ring 578. Passing completely through the length of coupling apparatus 530 is a channel, which acts as a fluid conduit for water or other substance.

Figure 8:
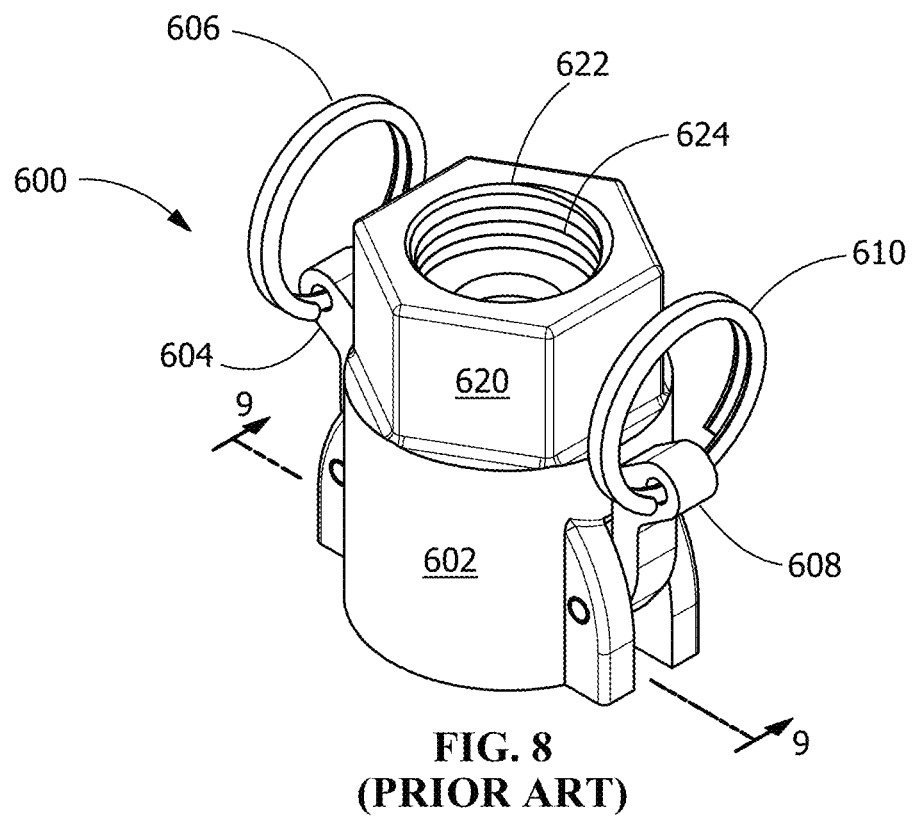
FIG. 8 is a perspective side view of a prior art cam lever connector/coupler.
Figure 9:
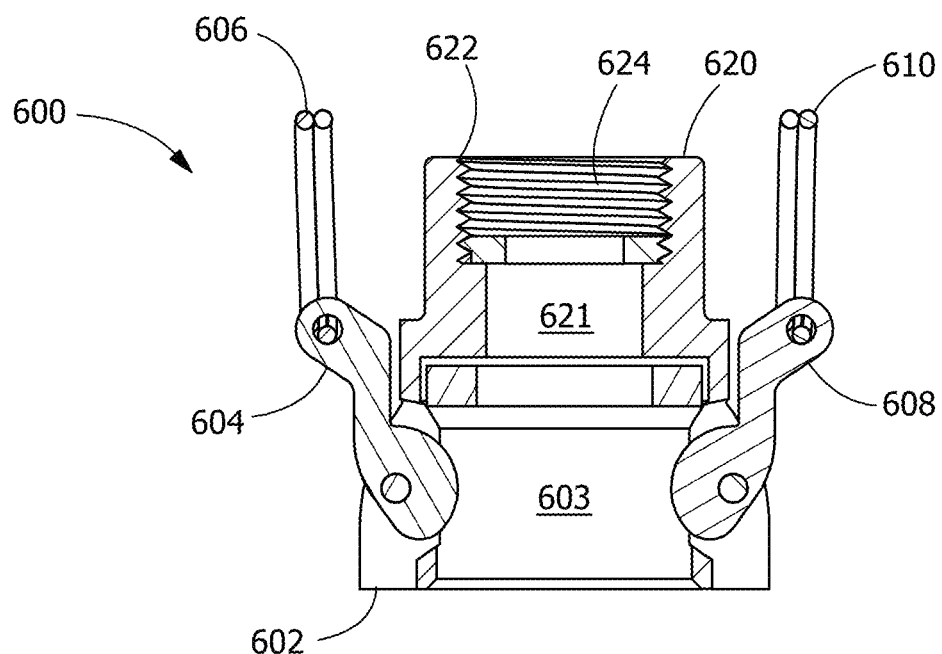
FIG. 9 is a cross-sectional side view of the prior art cam lever connector/coupler of FIG. 8.

As previously described, various embodiments of the invention are designed for use with cam lever-type connectors, which are commercially available devices used to connect or couple non-threaded items to threaded items and accessories. FIG. 8 is a perspective side view of a prior art cam lever connector; and FIG. 9 is a cross-sectional side view of the prior art cam lever connector of FIG. 8. As shown in these Figures, exemplary cam lever connector 600 includes cylindrical body portion 602 having channel 603 formed therein; first lever 604; first pull ring 606; second lever 608; second pull ring 610; hex nut portion 620 having channel 621 formed therein; and threaded portion 622 having channel 624 formed therein. In the configuration shown in FIGS. 8-9, cylindrical body portion 602 of cam lever connector 600 attaches to the male portion of the coupling bracket of the present invention (see FIG. 11) and provides a means for attaching threaded devices to the coupling bracket. Cam lever connector 600 is properly attached to one of the connecting regions of coupling apparatus 130 by placing the cam lever coupler over the connecting region and lifting upward (or downward based on placement) on the two levers (604 and 608) such that the inner portions of the levers engage the contoured portion of the connecting region and the flange of the connecting region forms a seal with a surface on the interior of the cam lever connector (see FIG. 9).

Figure 10:
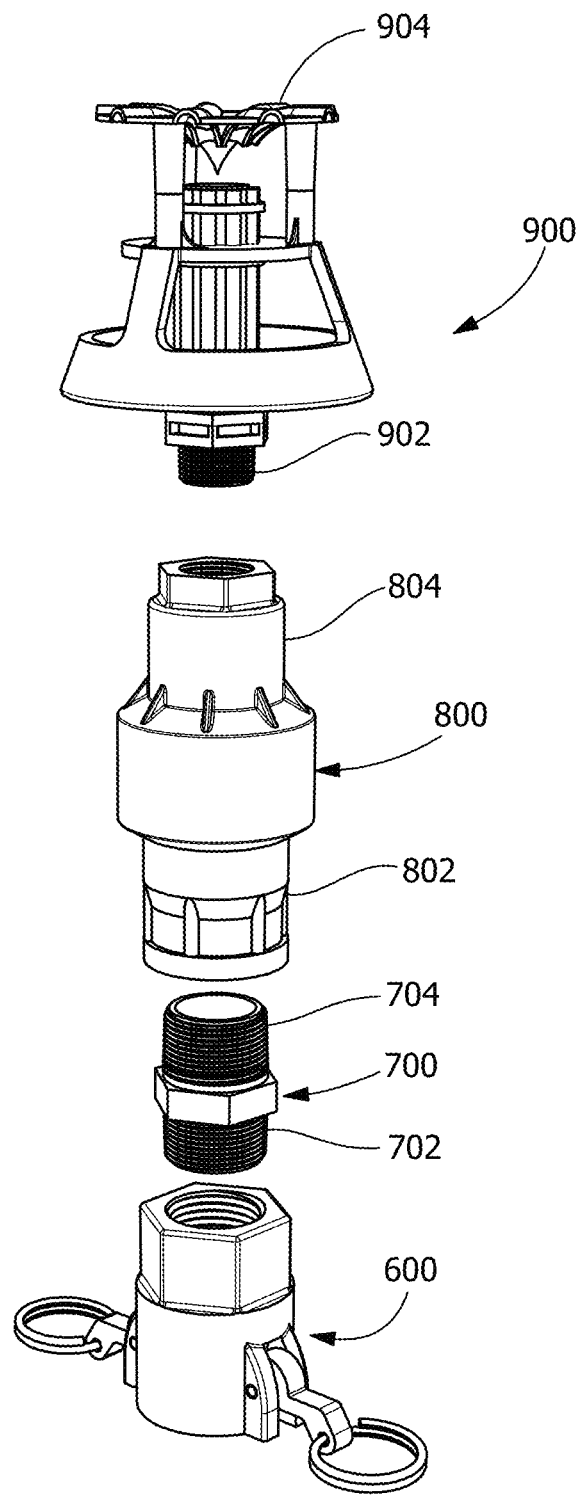
FIG. 10 is an exploded view of the upper portion of an exemplary irrigation system that is compatible with one or more embodiments of the coupling bracket of the present invention showing the various (prior art) components thereof properly positioned relative to one another.
Figure 11:
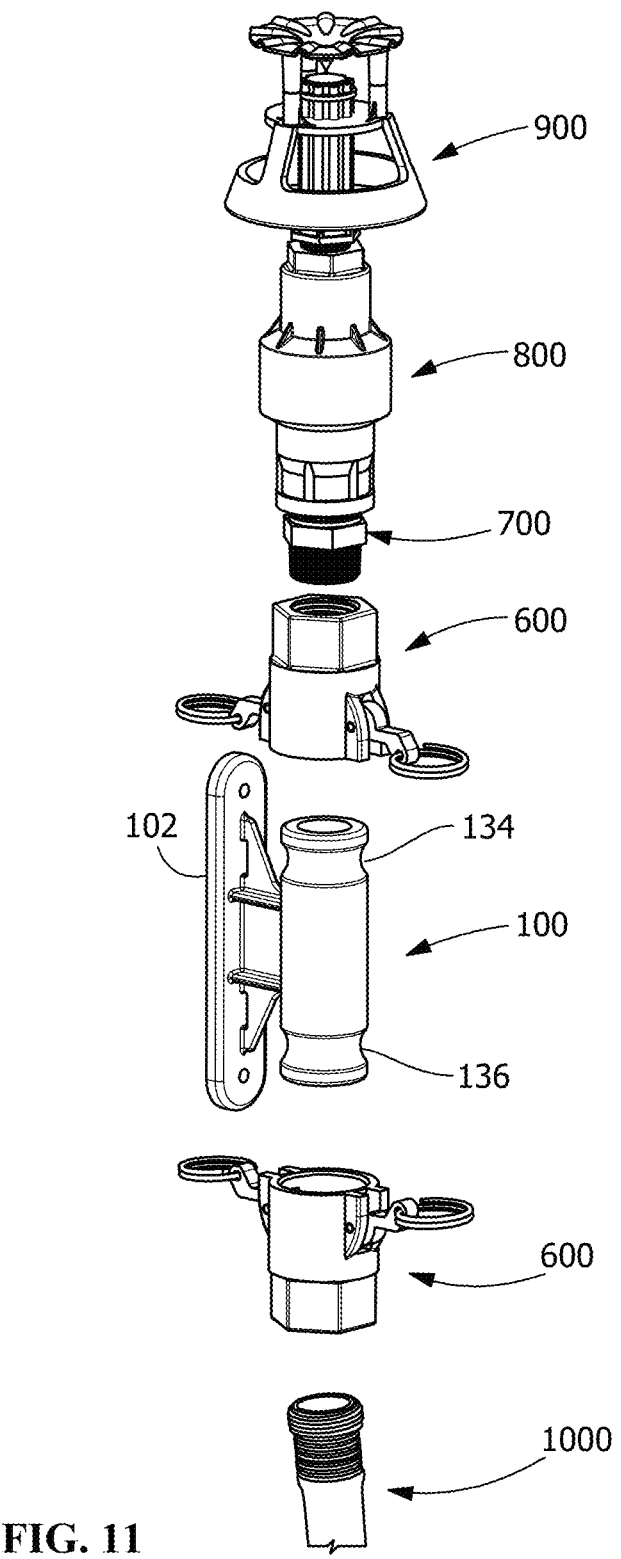
FIG. 11 is an exploded view of an exemplary irrigation system that utilizes one of the male/male coupling brackets of the present invention showing the various components thereof properly positioned relative to one another.

FIG. 10 provides an exploded view of the upper portion of an exemplary irrigation system that is compatible with one or more embodiments of the coupling bracket of the present invention showing the various (prior art) accessory devices thereof properly positioned relative to one another. In FIG. 10, the following components (accessory devices) are shown in proper spatial placement relative to one another prior to assembly: (i) cam lever connector 600 (Banjo); (ii) NPT (National Pipe Tapered thread) to GHT (garden hose thread) male adaptor 700 (Banjo) having lower threaded portion 702 and upper threaded portion 704; (iii) pressure regulator 800 (Senniger), having lower body portion 802 and upper body portion 804; and (iv) Xcel Wobbler® sprinkler head 900 (Senniger) having threaded body portion 902 and dispersing device 904. The upper portion of cam lever connector 600 attaches to threaded lower portion 702; upper threaded portion 704 attaches to lower body 802; and upper body portion 804 attaches to threaded body portion 902. FIG. 11 is an exploded view of an exemplary irrigation system that utilizes one of the male/male coupling brackets of the present invention (100) showing the upper portion of the irrigation system partially assembled and showing the manner in which a second cam lever connector 600 is utilized to attach standard water hose 1000 to the system. FIG. 12 is an assembled view of the irrigation system of FIG. 11 showing the various components thereof properly connected to one another to create a functional system. Numerous variations of this configuration are possible.

Although the present invention is described herein as utilizing cam lever connectors, it will be appreciated by those of ordinary skill in the art that the described coupling brackets may be modified to use many different connector types, threaded and otherwise. The coupling brackets of the present invention may be manufactured using standard manufacturing techniques and may be made from (for example) metals, plastics, polymers, or combinations thereof based on intended use. While the described coupling brackets are useful for transporting and delivering fluids such as water, these coupling brackets may also be used for systems that transport and deliver gases such as air or for other substances.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A coupling bracket for use with fluid or gas delivery systems, comprising:
   (a) an elongated central body portion having a first end portion, a second end portion, and a channel running lengthwise therethrough;
   (b) a first connecting region formed on the first end portion, wherein the first connecting region is adapted to receive a first accessory device;
   (c) a second connecting region formed on the second end portion, wherein the second connecting region is adapted to receive a second accessory device;
   (d) a connector connected to the body portion, the connector comprising first and second spaced apart openings, each of the first and second spaced apart openings disposed lengthwise between the first and second end portions; and
   (e) a base connected to the connector, the base comprising a first mounting aperture disposed through the base, the first aperture disposed lengthwise beyond the first end portion;

wherein the connector is configured to provide clearance space between the first connecting region and the base for the first accessory device to be connected to the first connecting region.

2. The coupling bracket of claim 1, wherein the first connecting region includes a male configuration that further includes a contoured portion and a terminal flange.

3. The coupling bracket of claim 2, wherein the second connecting region includes a male configuration that further includes a contoured portion and a terminal flange.

4. The coupling bracket of claim 1, wherein the first connecting region includes a female configuration that further includes a cam lever connector integral with the elongated central body portion.

5. The coupling bracket of claim 4, wherein the second connecting region includes a female configuration that further includes a cam lever connector formed integrally with the elongated central body portion.

6. The coupling bracket of claim 1, wherein the first connecting region is positioned at a predetermined angle relative to the second connecting region, and wherein the predetermined angle is between 10° and 170°.

7. The coupling bracket of claim 6, wherein the first connecting region includes a male configuration that further includes a contoured portion and a terminal flange.

8. The coupling bracket of claim 6, wherein the second connecting region includes a female configuration that further includes a cam lever connector formed integrally with the elongated central body portion.

9. The coupling bracket of claim 1, wherein the base is substantially flat.

10. The coupling bracket of claim 9, wherein the first connecting region includes a male configuration that further includes a contoured portion and a terminal flange.

11. The coupling bracket of claim 9, wherein the second connecting region includes a female configuration that further includes a cam lever connector formed integrally with the elongated central body portion.

12. The coupling bracket of claim 1, wherein the base is adapted to be removably mounted on a substrate.

13. The coupling bracket of claim 1, wherein each of the first and second spaced apart openings are adapted to receive a respective strap.

14. The coupling bracket of claim 1, wherein the first and second spaced apart openings are oriented transverse to lengthwise.

15. The coupling bracket of claim 1, wherein the body portion, the connector and the base are of integral construction.

16. The coupling bracket of claim 1, wherein the body portion, the connector and the base are of unitary construction.

17. The coupling bracket of claim 1, wherein at least one of the first connecting region and the second connecting region is adapted to receive respectively the first or second accessory device in a non-threaded manner.

* * * * *